(12) United States Patent
Whelan et al.

(10) Patent No.: US 7,657,914 B2
(45) Date of Patent: Feb. 2, 2010

(54) OBJECT MONITORING SYSTEM DETECTING MOTION AND TRACKING HUMAN SKIN

(75) Inventors: Michael David Clive Whelan, Narre Warren (AU); Matthew Daniel McArdell, North Fitzroy (AU); Andrew Lawrence Rowsell, Carnegie (AU); Zoltan Indiana Toth, Glenhuntly (AU); Robert Pieter Koger, Eltham North (AU)

(73) Assignee: Safehouse International Inc., Las Vegas, NV (US)

( * ) Notice: Subject to any disclaimer, the term of this patent is extended or adjusted under 35 U.S.C. 154(b) by 1026 days.

(21) Appl. No.: 10/257,462

(22) PCT Filed: Apr. 11, 2001

(86) PCT No.: PCT/AU01/00421

§ 371 (c)(1),
(2), (4) Date: Mar. 31, 2003

(87) PCT Pub. No.: WO01/78397

PCT Pub. Date: Oct. 18, 2001

(65) Prior Publication Data

US 2003/0163289 A1    Aug. 28, 2003

(30) Foreign Application Priority Data

Apr. 11, 2000    (AU) .................................. PQ6846

(51) Int. Cl.
*H04N 7/173* (2006.01)
*H04N 7/18* (2006.01)
*H04N 5/232* (2006.01)

(52) U.S. Cl. .................... 725/105; 348/159; 348/211.3; 348/211.6; 348/211.11

(58) Field of Classification Search ................. 725/105; 348/143, 152–5, 159, 207.99, 207.1, 201.11, 348/211.99, 211.1–211.14
See application file for complete search history.

(56) References Cited

U.S. PATENT DOCUMENTS

| | | | | |
|---|---|---|---|---|
| 5,812,193 | A * | 9/1998 | Tomitaka et al. | 348/369 |
| 6,188,777 | B1 * | 2/2001 | Darrell et al. | 382/103 |
| 6,320,501 | B1 * | 11/2001 | Tice et al. | 340/517 |

(Continued)

*Primary Examiner*—Sinh Tran
*Assistant Examiner*—Daniel M Pasiewicz
(74) *Attorney, Agent, or Firm*—Harness, Dickey & Pierce, P.L.C.

(57) ABSTRACT

An object monitoring system, including a slave system having slave processors (14, 16) and a plurality of cameras (10) for monitoring one or more objects, images of the cameras (10) being processed by respective ones of the slave processor (14, 16), and the slave processors including sensors (30) assigned to respective cameras (10) and at least parts of the fields of view of the cameras (10) to detect predetermined characteristics of the at least parts and generate a trigger in response thereto. A master system has to master processor (20) including agents (34) assigned to at least one of the objects and having one or more of the sensors (30) allocated thereto, the agents (34) each generating an event on receiving triggers from the one or more allocated sensors (30). An event system (6) receives the events and determines whether an alarm condition exists. A user interface system (8) can configure the sensors (30) and agents (34) and respond to events. The monitoring can be used to protect a number of objects, such as paintings and artworks held in a number of locations, from human theft.

39 Claims, 16 Drawing Sheets

U.S. PATENT DOCUMENTS 6,891,566 B2 * 5/2005 Marchese ................ 348/211.3
6,954,859 B1 * 10/2005 Simerly et al. .................. 726/3
7,124,427 B1 * 10/2006 Esbensen .................... 725/109

* cited by examiner

OBJECT MONITORING SYSTEM DETECTING MOTION AND TRACKING HUMAN SKIN

The present invention relates to an object monitoring system and, in particular, to a security system and processes executed by the system to protect objects, and software for executing the processes. More specifically, the invention is directed to a distributed system architecture for monitoring a number of areas.

Security systems using closed circuit television (CCTV) or video cameras have been developed in various forms to monitor events in an area. When an event occurs which is considered to breach security in the monitored area an alarm condition is entered and an alarm signal can be generated. The level of sophistication of the monitoring based on the signals produced by the cameras varies considerably. For example, the video images produced by the cameras may simply be presented to display screens which are monitored by security personnel who will determine when an event gives rise to an alarm condition. Other systems may store the video frames generated by the cameras for subsequent processing and comparison to determine whether an event has occurred. To achieve this type of processing different electrical and electronic systems have been developed in the past to compare characteristics of adjacent video frames, which may involve image subtraction and differencing to determine whether differences have occurred in chronologically adjacent frames. These systems include dedicated frame processing circuitry and are limited in the forms of monitoring which can be executed by the system. For instance, frames of individual cameras are processed but there is no reference between frames of different cameras. In addition to being inflexible, the systems are subject to the detection of false events or alarms due to intensity changes or shadowing which may occur in a monitored area or even due to normal and allowed movement within an area.

It is desired to provide a system and architecture which alleviates the above difficulties or at least provides a useful alternative.

The present invention provides an object monitoring system, including:

a slave system having slave processors and a plurality of cameras for monitoring one or more objects, images of said cameras being processed by respective ones of said slave processors, and said slave processors including sensors assigned to respective cameras and at least parts of the fields of view of said cameras to detect predetermined characteristics of said at least parts and generate a trigger in response thereto; and a master system having a master processor including agents assigned to at least one of said objects and having one or more of said sensors allocated thereto, said agents each generating an event on receiving said trigger from the one or more allocated sensors.

The present invention also provides an object monitoring system, including:

a plurality of sensors assigned to respective zones in a monitored area and which process pixels representing a zone to detect predetermined characteristics in said zone and generate a trigger in response thereto; and a plurality of agents respectively assigned to at least one object and having one or more of the sensors allocated thereto, said agents generating respective events on receiving triggers from the one or more allocated sensors.

Preferably, the sensors and agents are software objects and the triggers and events are messages generated by the objects.

The present invention also provides a method of monitoring an object, including:

monitoring a zone in an area using a sensor which processes pixels representing said zone;

detecting predetermined characteristics in said zone using said sensor and generating a trigger in response thereto;

receiving said trigger at an agent assigned to said object and to which said sensor is assigned; and generating an event using said agent in response to receiving triggers from sensors assigned to the agent.

The present invention also provides computer software for executing the above steps.

Preferred embodiments of the present invention are hereinafter described, by way of example only, with reference to the accompanying drawings, wherein.

Figure 1:
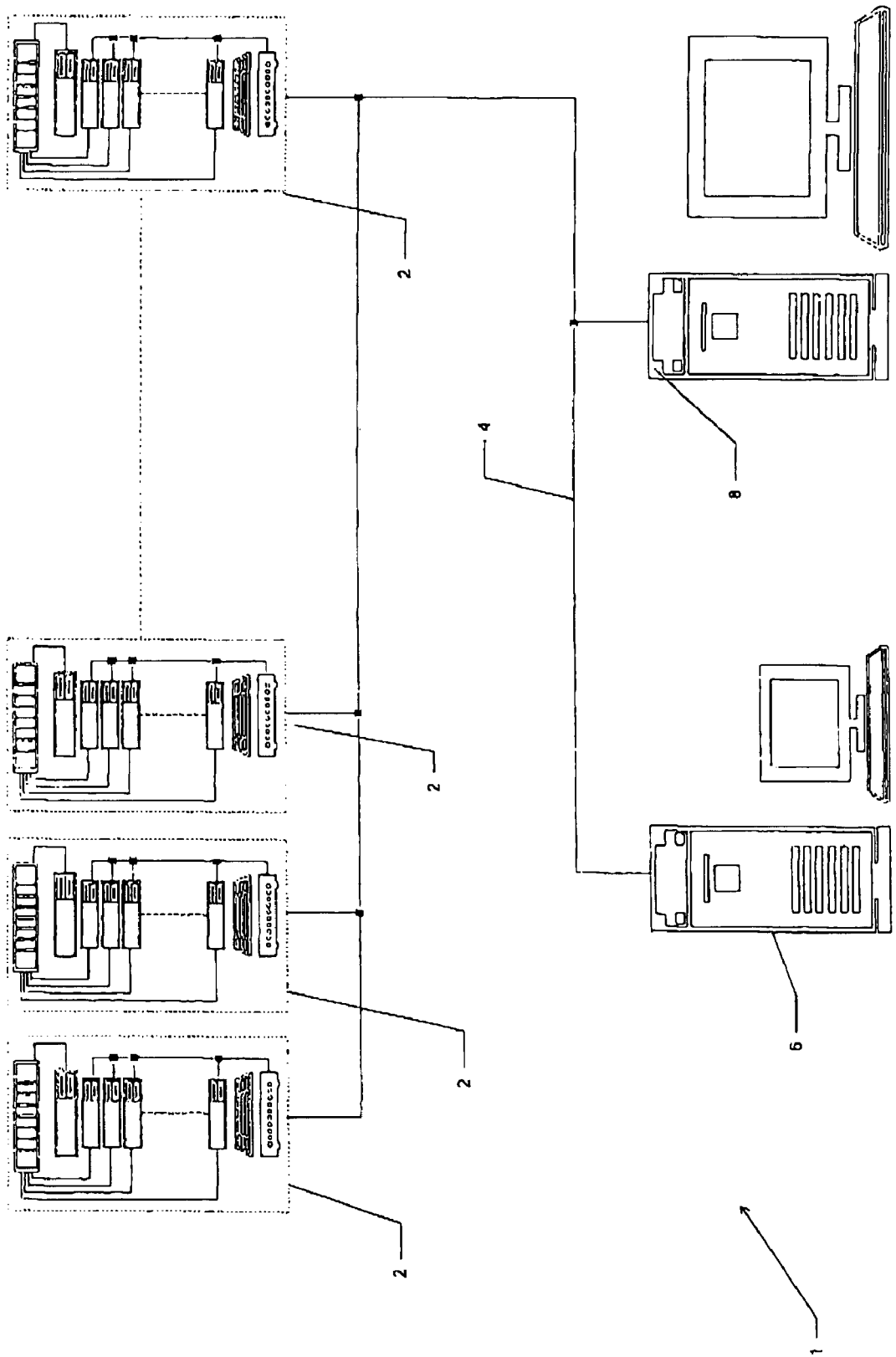
FIG. 1 is a block diagram of a preferred embodiment of a security system.

A security system 1, as shown in FIG. 1, includes a number of nodes 2 which are connected by a node network 4 to a system server 6 and a graphic user interface server 8. The number of nodes 2 used in the system depends entirely upon the size of the area or environment to be secured and the number of objects in the area to be monitored and protected. The network 4 may be a TCP/IP network and the servers 6 and 8 standard personal computers (PCs).

Figure 2:
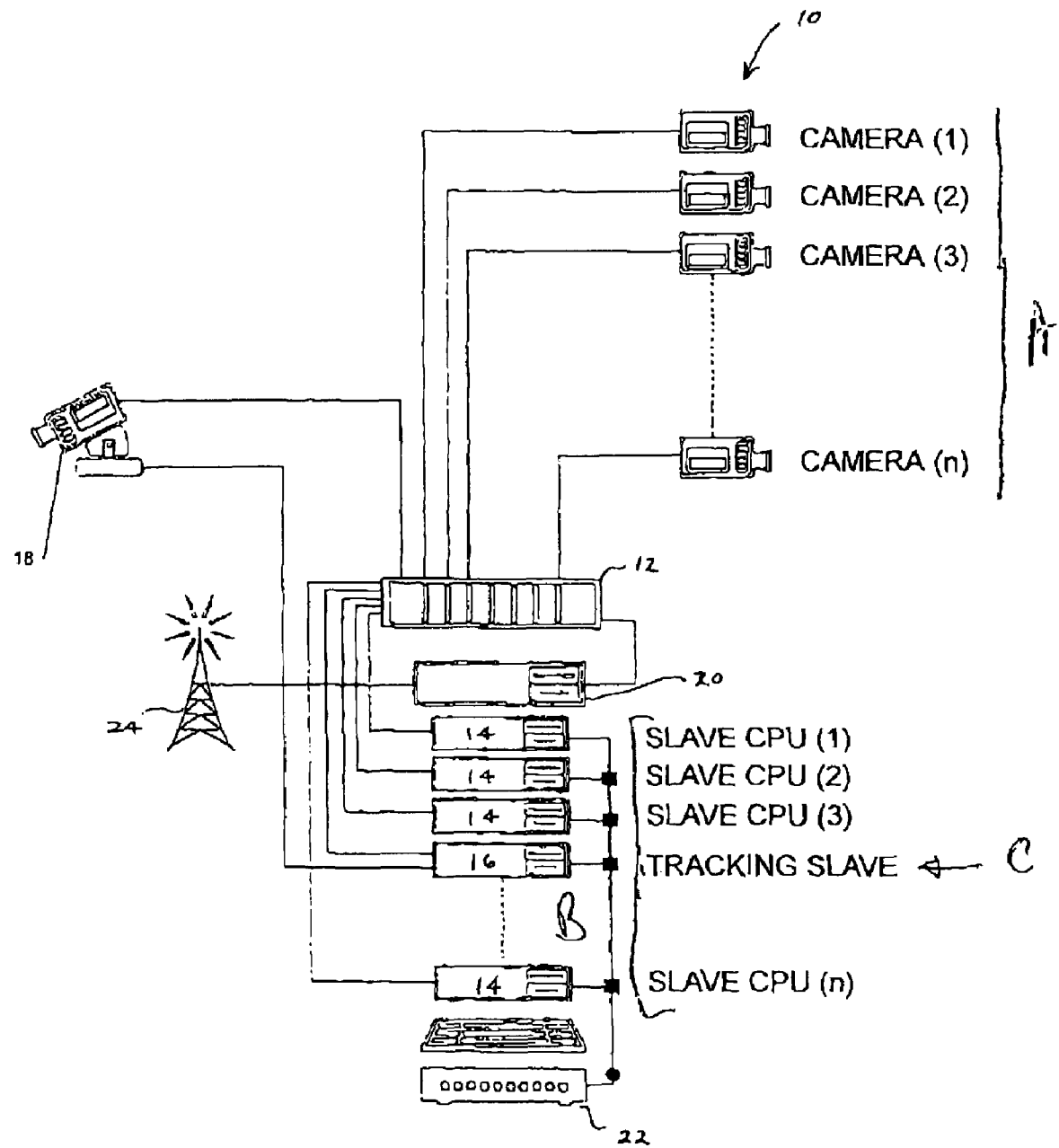
FIG. 2 is a block diagram of system components of a node of the security system.
Figure 3:
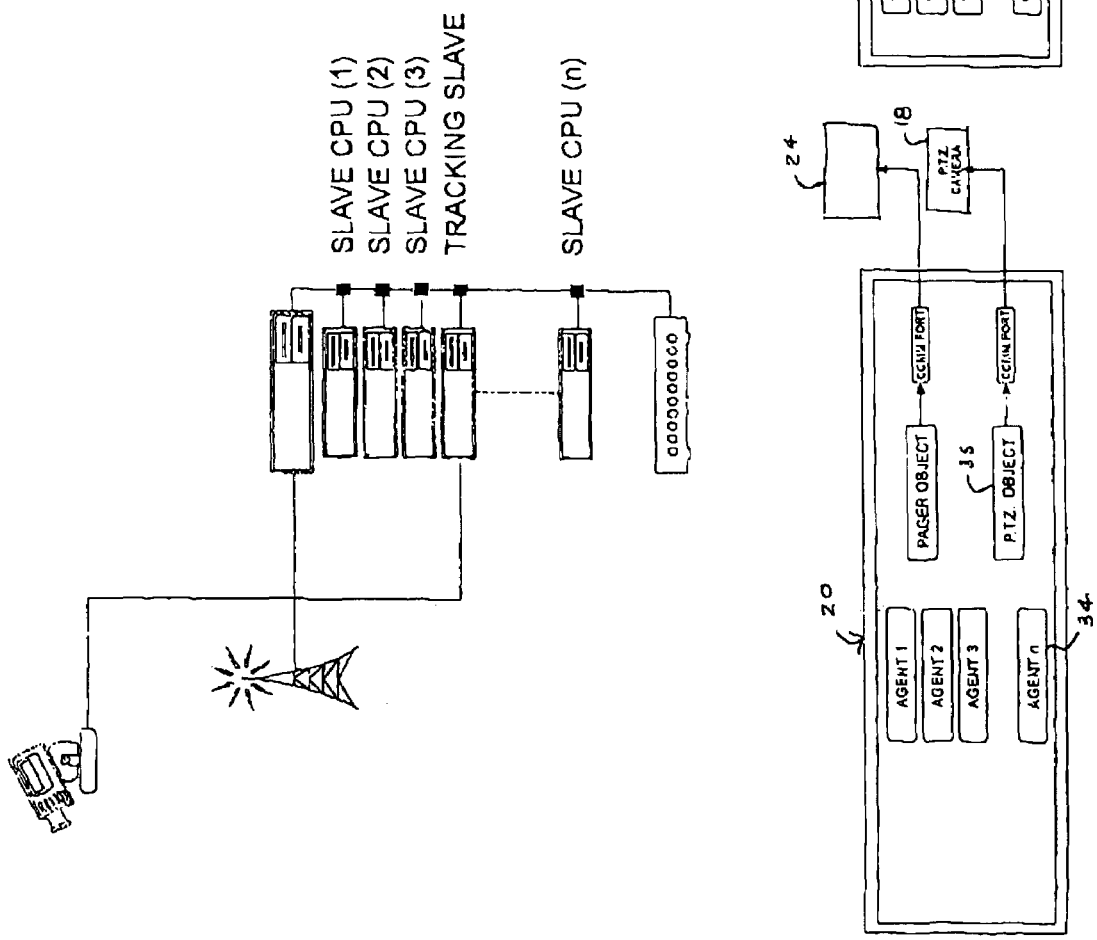
FIG. 3 is a block diagram of the software components of and associated with the nodes.

The nodes 2, as shown in FIGS. 2 and 3, handle video feeds or signals generated by a plurality of video cameras 10. The video frames generated by the cameras are fed by a standard video switch 12 to slave processors 14. The slave processors 14 may each be PCs, and each have a number of dedicated software objects stored thereon. Each video camera 10 belongs to or is allocated to one slave processor 14. A tracking slave processor 16 is used to control and handle video frames generated by a pan tilt zoom (PTZ) camera 18. A node 2 also includes a master processor 20, which also may be a standard PC, that handles messages generated by the slave processors 14 and 16. All of the processors 14, 16, 20 are connected by a hub 22 of the network 4. In addition, the video signals from the cameras may also be fed to another video switch to be fed to a control room for manual monitoring. Messages generated by the master processor 20 may be sent by a paging transceiver 24 instead of or in addition to sending the messages on the network 4.

Figure 4:
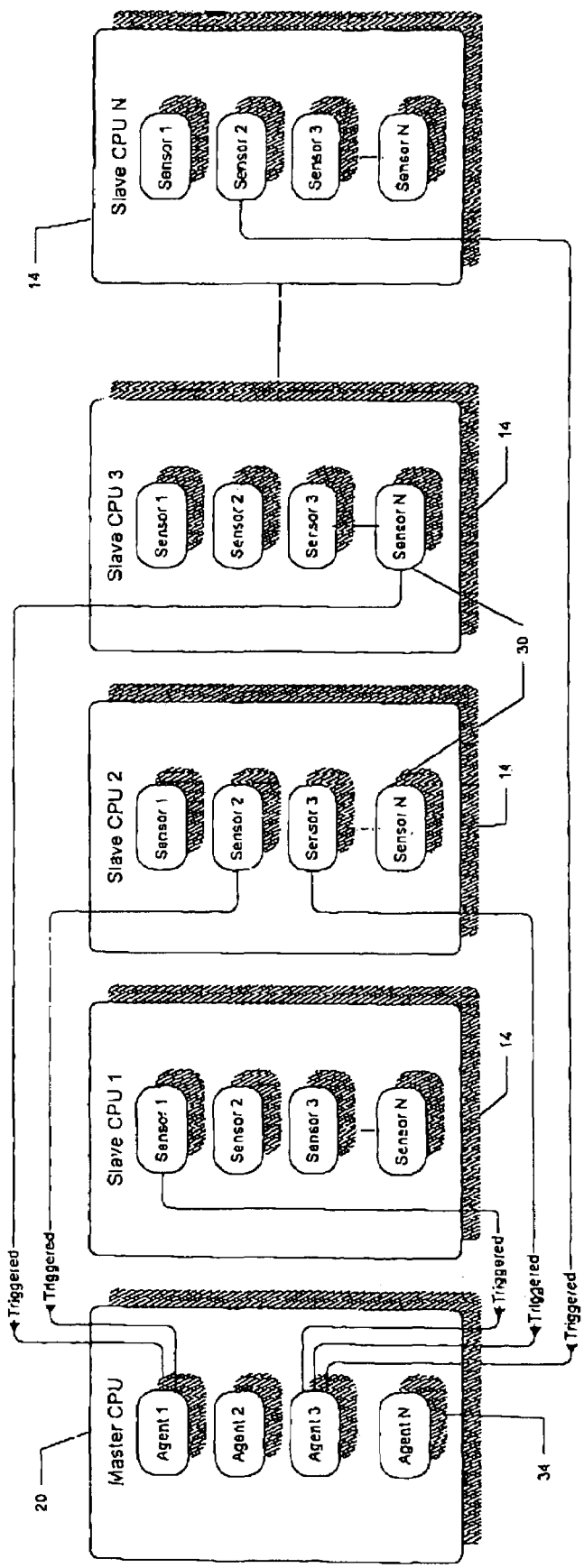
FIG. 4 is a block diagram of an implementation of the software objects of the system.

All of the processors 14, 16 and 20 and the servers 6 and 8 execute their own set of dedicated software objects and run only one instance of each object The slave processors 14 and 16 of a node, as shown in FIGS. 3 and 4, host a set of sensors 30 and other objects for processing the received video frames, such as a frame grabber object 32. A sensor 30 is a software object which is responsible for detecting predetermined characteristics, such as changes, in a received video frame. The sensors 30 each analyse pixels of different areas or parts of the frames received, and the parts may overlap. For example, if a video camera is static then the field of view is fixed and the sensors 30 for the camera monitor respective parts of that field of view. A sensor 30 may also process all pixels of a frame. When a sensor 30 detects a predetermined characteristic or change then it generates and sends a trigger message. The sensors 30 may also be of different types, such as video motion sensors, tracking sensors and hardware input sensors, as described below.

The master processor 20 of each node 2 hosts a set of agents 34. The agents 34 are software objects which are each able to register interest in or be allocated to one or more respective sensors of the slave processors 14 and 16. An agent is able to generate and send event messages to the event server 6 when it determines an event has occurred on the basis of the trigger messages it receives from its registered sensors 30. The nature of an event depends on the environment or area being monitored but may include when a person enters a protected area or when a secure door is breached. For example, as shown in FIG. 4, agent 1 of the master processor 20 may only generate an event message when, it receives a trigger message from sensor 2 of the second slave processor and sensor N of the third slave processor. Agent 3, on the other hand, generates an event message when it receives trigger messages from sensor 1 of the first slave processor, sensor 3 of the second slave processor and sensor 2 of the Nth slave processor. An agent may generate an event message in response to one trigger signal from one registered sensor or require a number of trigger messages to be generated from a single sensor or a number of sensors. The event messages are sent directly to the event server 6, but if the server 6 is unreachable for some reason then the images are placed on a persistent queue for subsequent retries.

The event server 6 receives and stores all event messages. It may forward all event messages to the user interface server 8 for display. Alternatively it may forward selected event messages. The event server 6 is also able to determine when an alarm condition occurs. It may be configured so as to consider that an alarm condition occurs when any event message is sent from one of the nodes 2 or will require a particular combination of event messages to send a message to the user interface 8 indicating than an alarm condition has occurred. The particular combination of event messages may also need to be received within predetermined time constraints. Once an alarm condition has occurred, the event server 6 or the user interface server 8 can be used to send and generate appropriate alarm signals.

The user interface server 8 generates all displays for a graphic user interface for operators and allows an authorized operator to configure the security system, which includes the creation and establishment of required agents 34 and sensors 30 for the system. Configuration also involves defining the agents and servers and their relationship, and establishing the manner in which event messages are handled and how they are acted upon.

Figure 5:
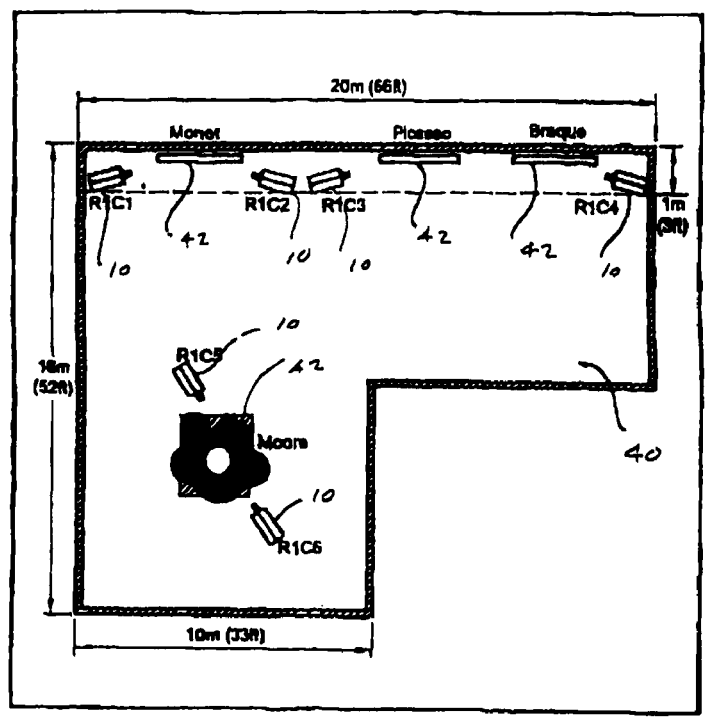
FIG. 5 is a floor plan of an area monitored by the security system.
Figure 6:
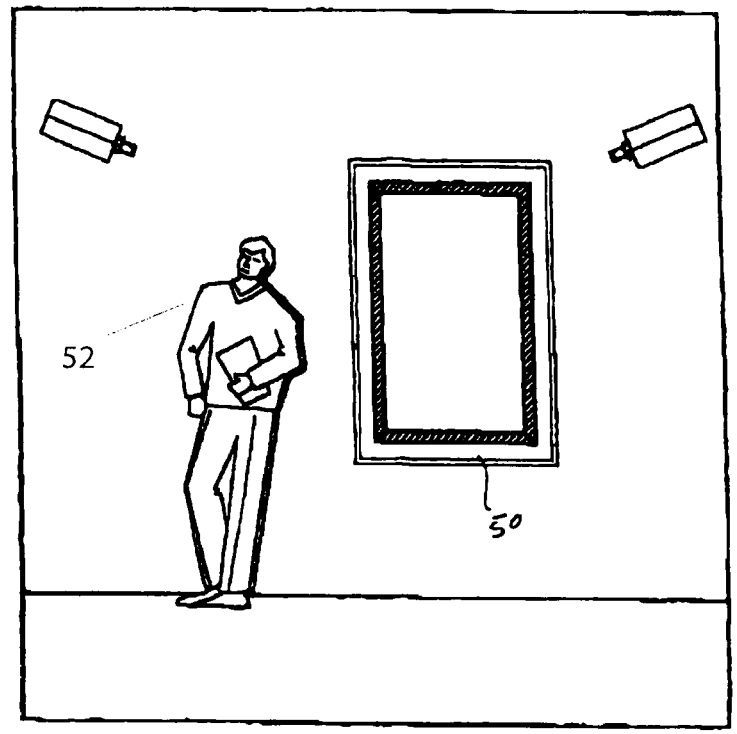
FIG. 6 is a diagram of an object monitored by the security system.
Figure 7:
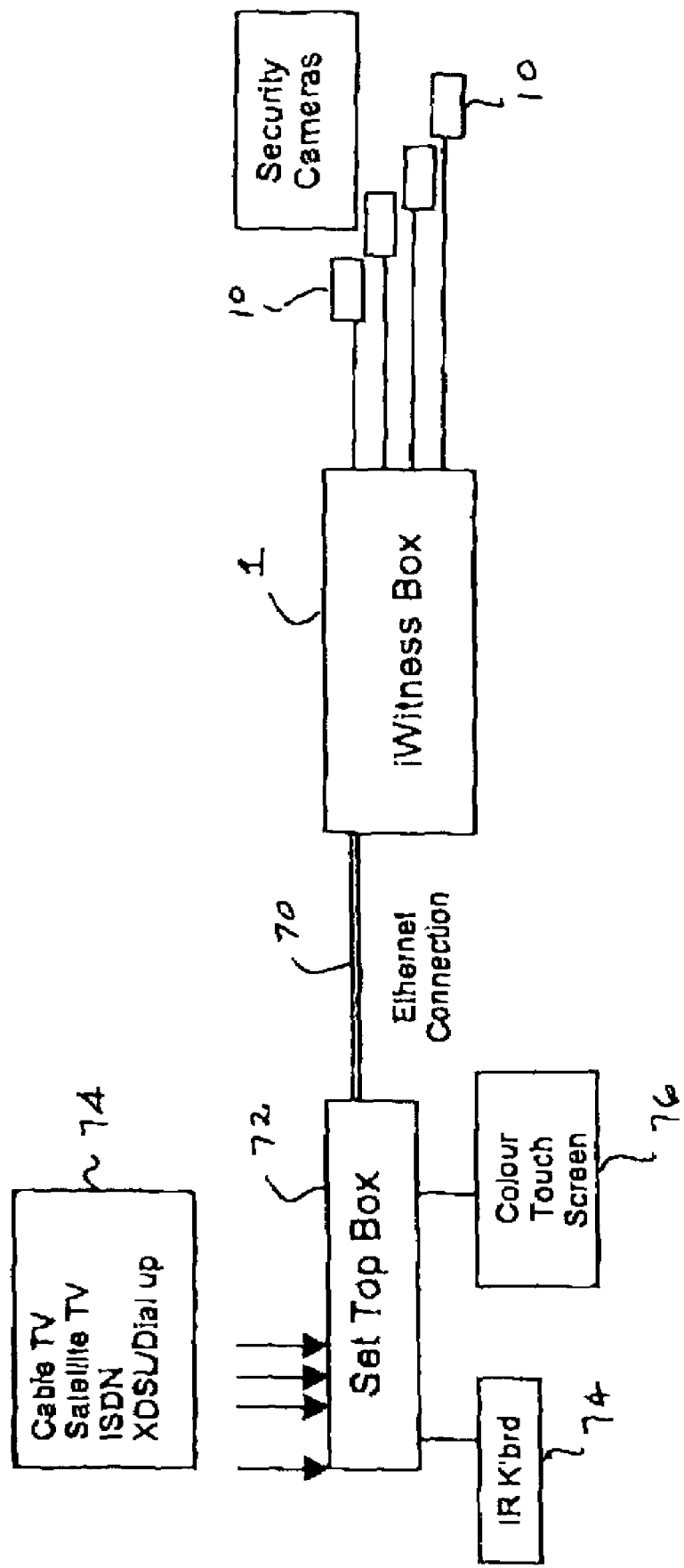
FIG. 7 is a block diagram of a control platform connected to the security system.

The security system 1 can monitor a number of areas within an environment simultaneously, and one of the areas may be a room 40, as shown in FIG. 5. The room 40 may include a number of objects 42 that need to be monitored and protected. The cameras 10 of a node 2 can be placed in the room so as to provide effective monitoring of the objects 42. One or more cameras may be allocated to each object 42. The architecture of the system is particularly advantageous as it allows a sensor 30 to be assigned to a particular region within the field of view of the camera 10 to detect any changes or movement within that field of view. The sensors 30 for any camera are established using the user interface server 8 by drawing polygons around the boundary of the region in the field of view of a camera 10 to define a monitored zone which the sensor operates on. The sensor 30 will then only process pixels in that zone or region for the video frames received by its slave processor. For example, the video motion detection (VMD) sensors will only consider breaches or changes within that monitored zone. When a breach is detected in the monitored zone then the sensor generates a trigger. For a painting 50, as shown in FIG. 6, a polygon can be drawn around the edge of the painting so as to create a sensor 30 for the boundaries of that painting. By using a number of different camera angles provided by different cameras 10 placed on the same object, sensors 30 can be created around the object from different fields of view so as to eliminate nuisance alarms. For instance, in the situation illustrated in FIG. 6, if only one camera was used to protect the object 50 then an alarm may sound when a person 52 interrupts one camera view of the object 50. This can be avoided by using at least two cameras 10 and two sensors 30 operating on different fields of view. Depending on the object 42 and the field of view it may also be appropriate to place a camera 10 vertically mounted above the object.

The VMD sensors each execute a detection process on the pixels of their monitored zone which involves comparing the pixels obtained for a video frame with a statistical model of normality for those pixels. When the security system is installed and the sensors have been defined, the sensors first establish the statistical model of normality by processing a number of pixels over successive video frames for the monitored zone when it is known that there are no breaches of the zone. The VMD sensors operate on the hue, saturation and brightness levels of the pixels with reference to the hue, saturation and intensity, colour space for video pixels. Operation on hue saturation, and brightness variations in the colour space with reference to the normality model gives rise to accurate generation of trigger messages when a sensor boundary is breached by another object other than the object being protected.

The tracking sensors 30 are configured to recognise and track regions in a zone that are recognised as belonging to a human. In stable illumination conditions, the colour of human skin forms a relative compact distribution in the hue, saturation, and intensity space of observable colours, and this is found to be irrespective of race. Although skin colour is inconsistent under drastic changes in illumination, once a face, for example, is detected and verified, its apparent colour can be robustly and consistently tracked by updating a scene specific, adaptive colour model for the tracking sensor. It has been determined that the colour model can be based on a skin pigment that falls within a predetermined hue and saturation range. The tracking sensors are accordingly set to track a cluster of pixels within this range.

The tracking sensors can be implemented based on a principle of integrated active multi-view face recognition. The security system 1 is unique in its ability to cope with a dynamic environment when human subjects are mostly in constant motion at varying distances away from the cameras. The system takes an integrated approach to real-time face detection, tracking and recognition on the basis of the following:

(i) Face detection and tracking is executed automatically on any arbitrary view and varying distance in the given monitored zone of the sensor without any need for manual intervention. Faces appearing in the zone are automatically detected by the sensor and tracked in a distance away from the camera of the sensor with a very small target size, down to 5×5 pixels of a frame. The face tracing process executed by the sensor provides estimates of face position or displacement, scale and also a pose on a face that is sufficiently close to the camera.

(ii) The tracking sensor computes a 3D pose of a tacked face in real-time, and is able to generate control messages for a PTZ camera software object 35 of the tracking slave processor 16 to actively pan and tilt the PTZ camera 18 to lock on a moving face and sample images over time for recognition. The security system utilises the PTZ camera 18 as an active camera with closed loop feedback control from the tracking sensors 30 directly to the camera's pan, tilt and zone functions controlled by the camera object 35.

(iii) Recognition can be performed that models the view across a wide range of views of different cameras 10 using a number of tracking sensors rather than at a single restricted frontal view. Face identities can then be modelled through learning and 3D information about a face inferred implicitly, such as head pose and the correspondence between facial features observed from a profile and profile to profile views.

Figure 8:
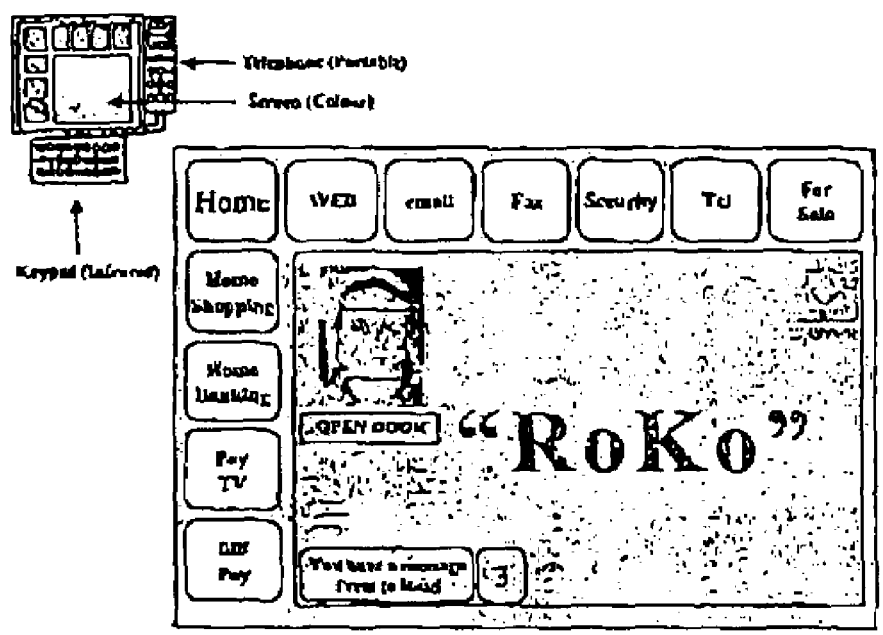
FIGS. 8, 9, 10 and 11 are examples of screen displays generated by user interfaces of the platform and the system.
Figure 9:
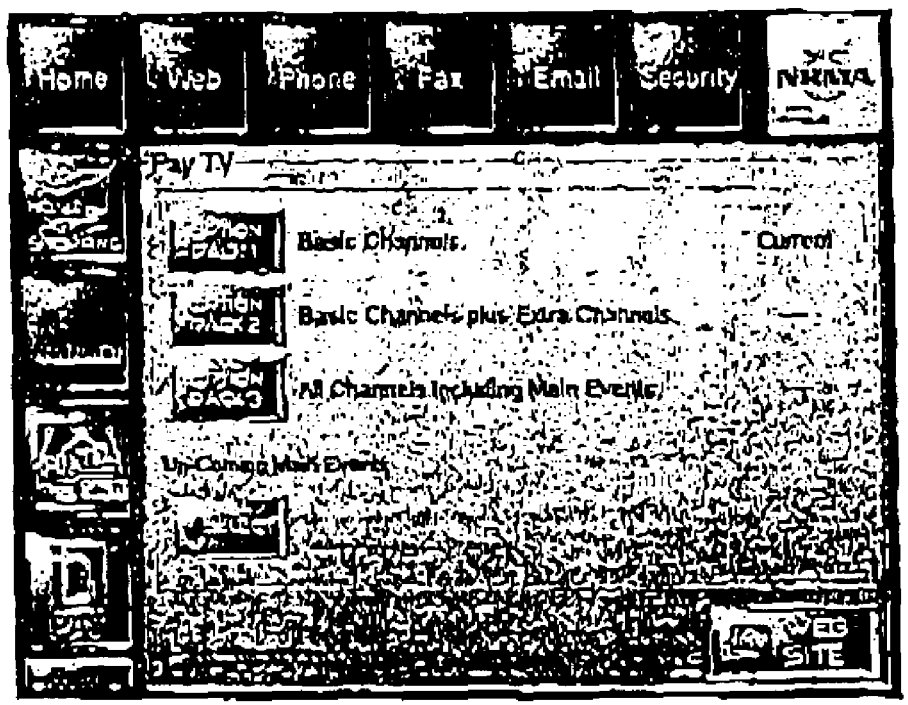
Figure 10:
Figure 11:
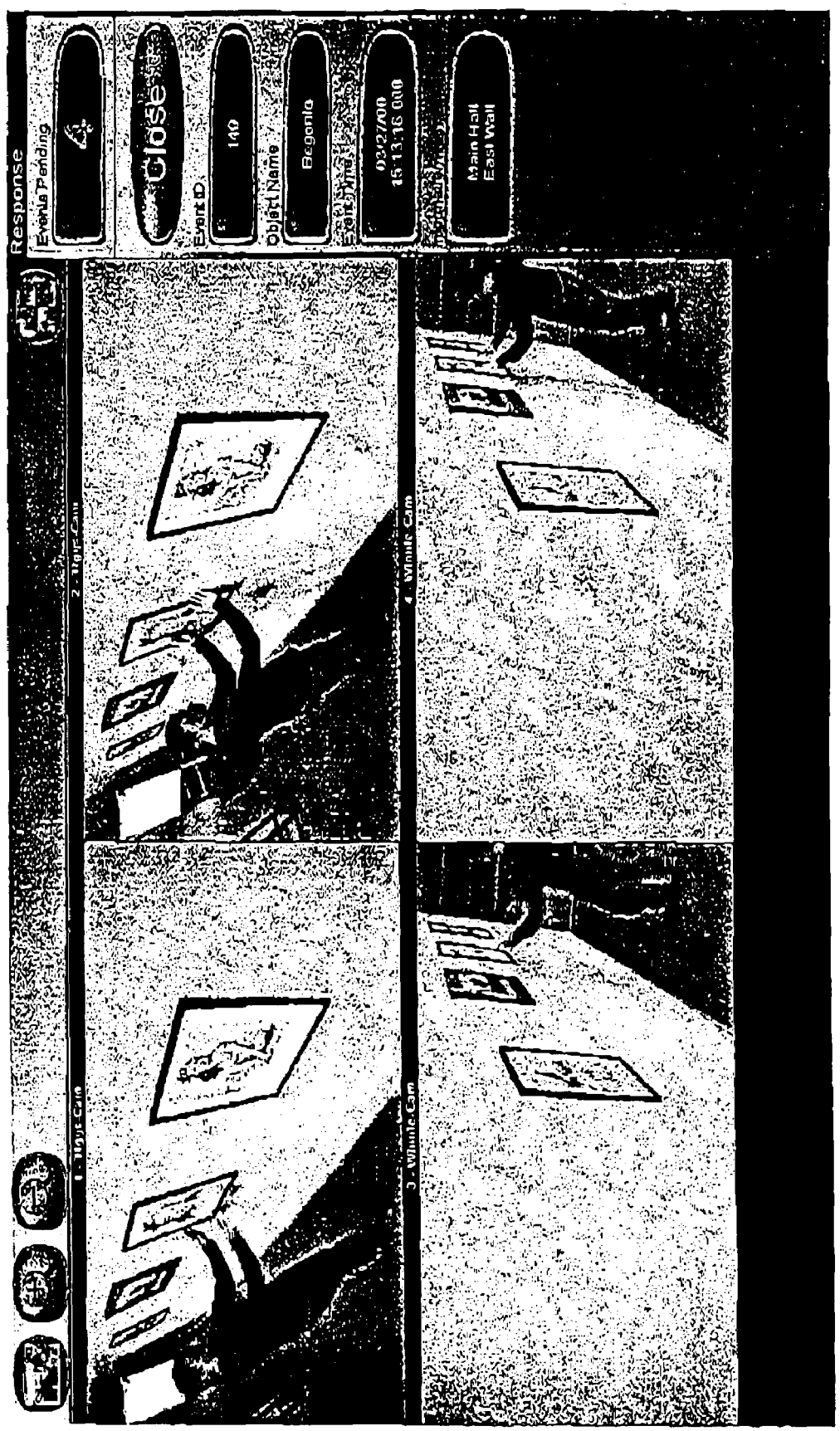
Figure 12:
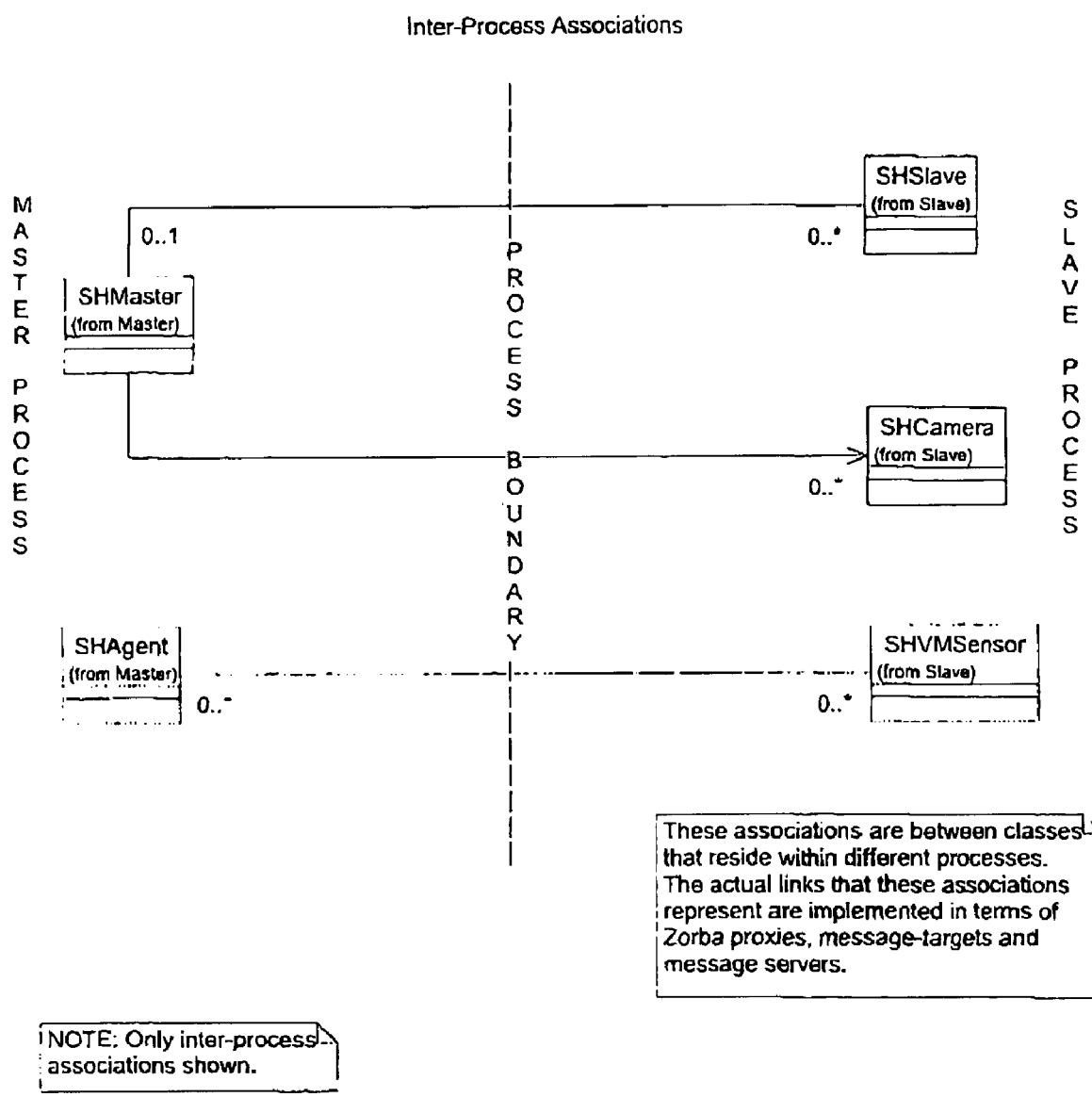
FIGS. 12 to 16 are entity relationship diagrams for software classes of the system.
Figure 13:
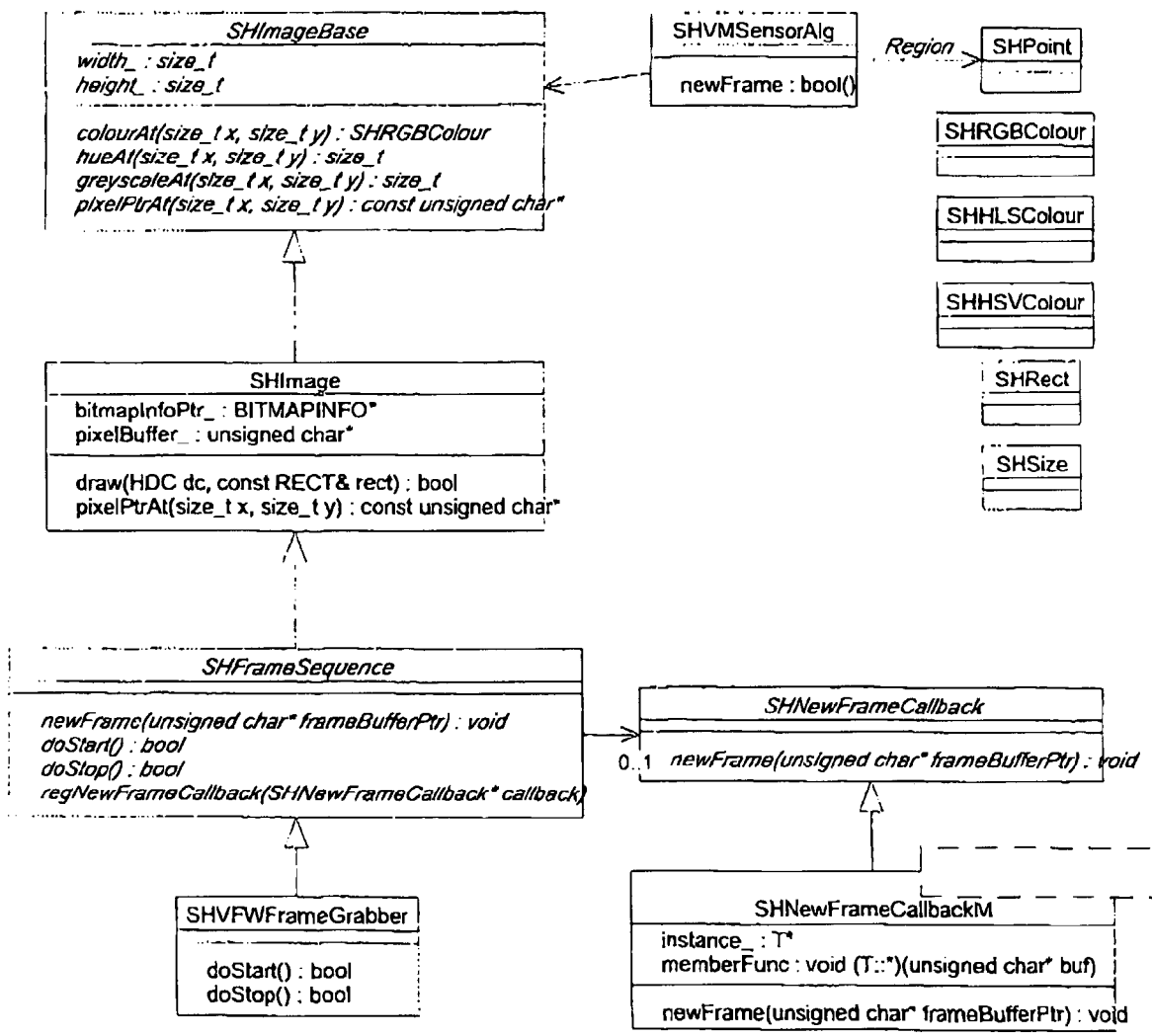
Figure 14:
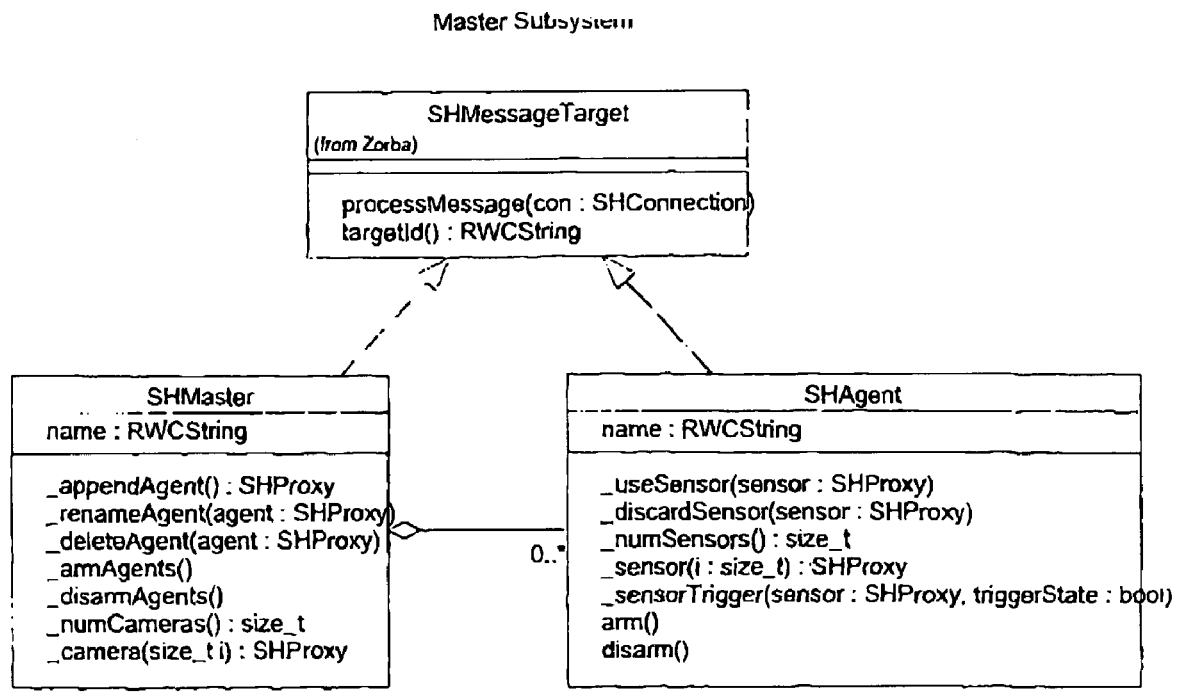
Figure 15:
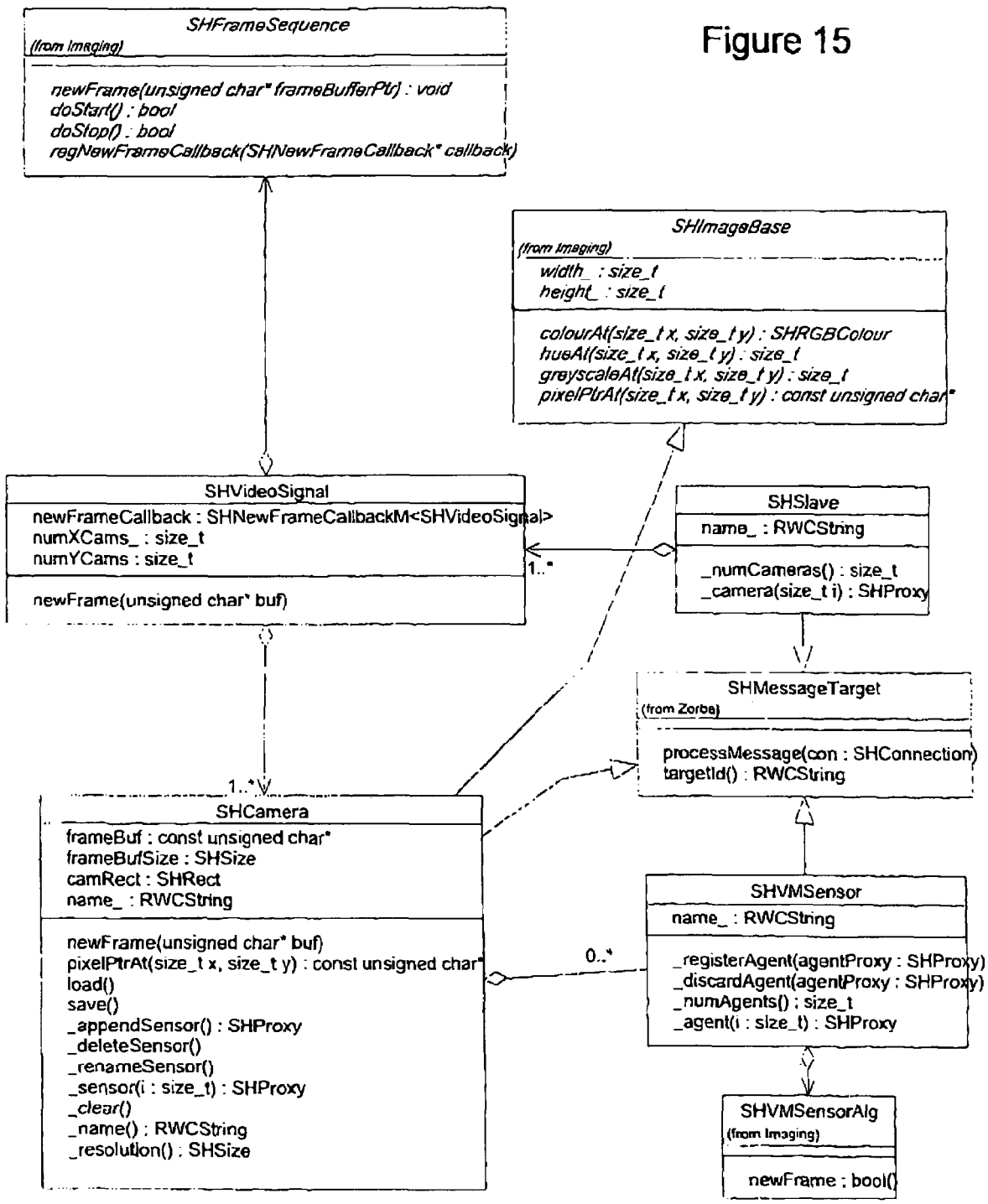
Figure 16:
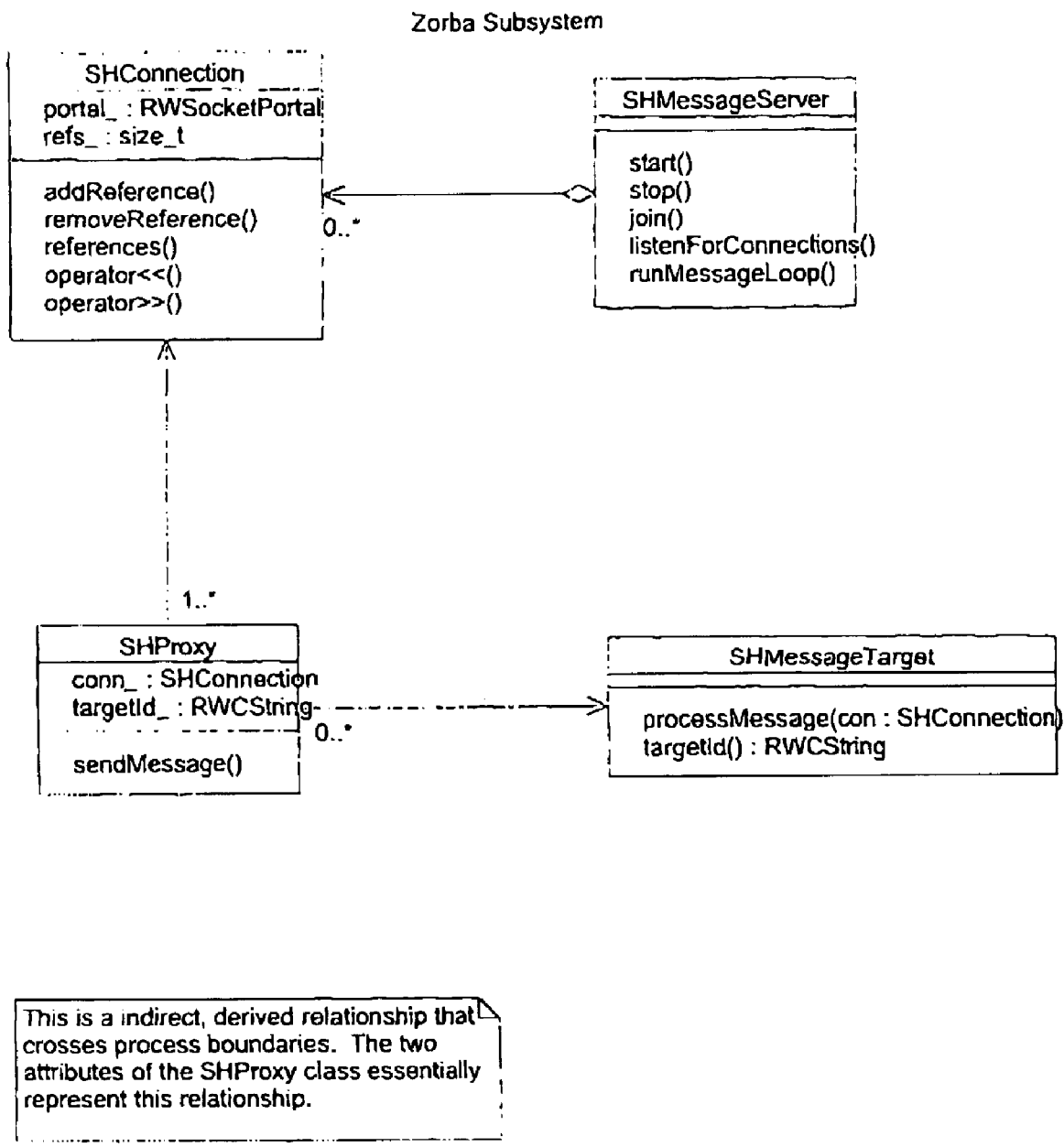

The security system 1 can be connected by a network connection 70, which may be Ethernet or TCP/IP, to a control platform 72 which is able to receive data signals from a variety of sources 74, in addition to messages sent by and to the security system 1 over the connection 70. The platform 72 may be PC-based or comprise a set top box and have associated with it an infrared keyboard 74 or other peripheral devices, such as a telephone. The platform also has a display screen 76 for displaying user interfaces, as shown in FIGS. 8, 9, 10 and 11. The provision of the display screen 76 may remove the requirement for the security system 1 to have one or more display screens. For example, FIG. 10 is an interface of the server 8 used for configuration of the system 1 and FIG. 11 is an interface of the server 8 generated in response to events. The display screen 76 may be unique for the platform 72 or the user interface simply presented on existing display screens in a secured environment, such as TV screens. The various sources 74 may comprise other network services, such as ISDN, DSL or dial up Internet services, or TV services, such as cable and satellite pay TV digital feeds The control platform allows control and direction of the various digital feeds from the sources 74 and information that can be obtained from the security system 1 and its cameras 10. All control is facilitated via the user interface displayed in FIGS. 8 and 9. This provides a number of controls to access selected TV services, Internet services and security services. Any of the video feeds from the cameras 10 or the pay TV services can be displayed on the screen and selected. For example, as shown in FIG. 8, parties can be viewed at monitored areas in the environment and devices, such as doors, controlled using the interface.

A logical view report is provided on pages 10 to 19 which provides further details on the software objects and the messaging architecture used by the security system 1. Entity relationship diagrams for the objects are provided in FIGS. 12 to 16. Process examples are shown in FIGS. 17 and 18.

Figure 17:
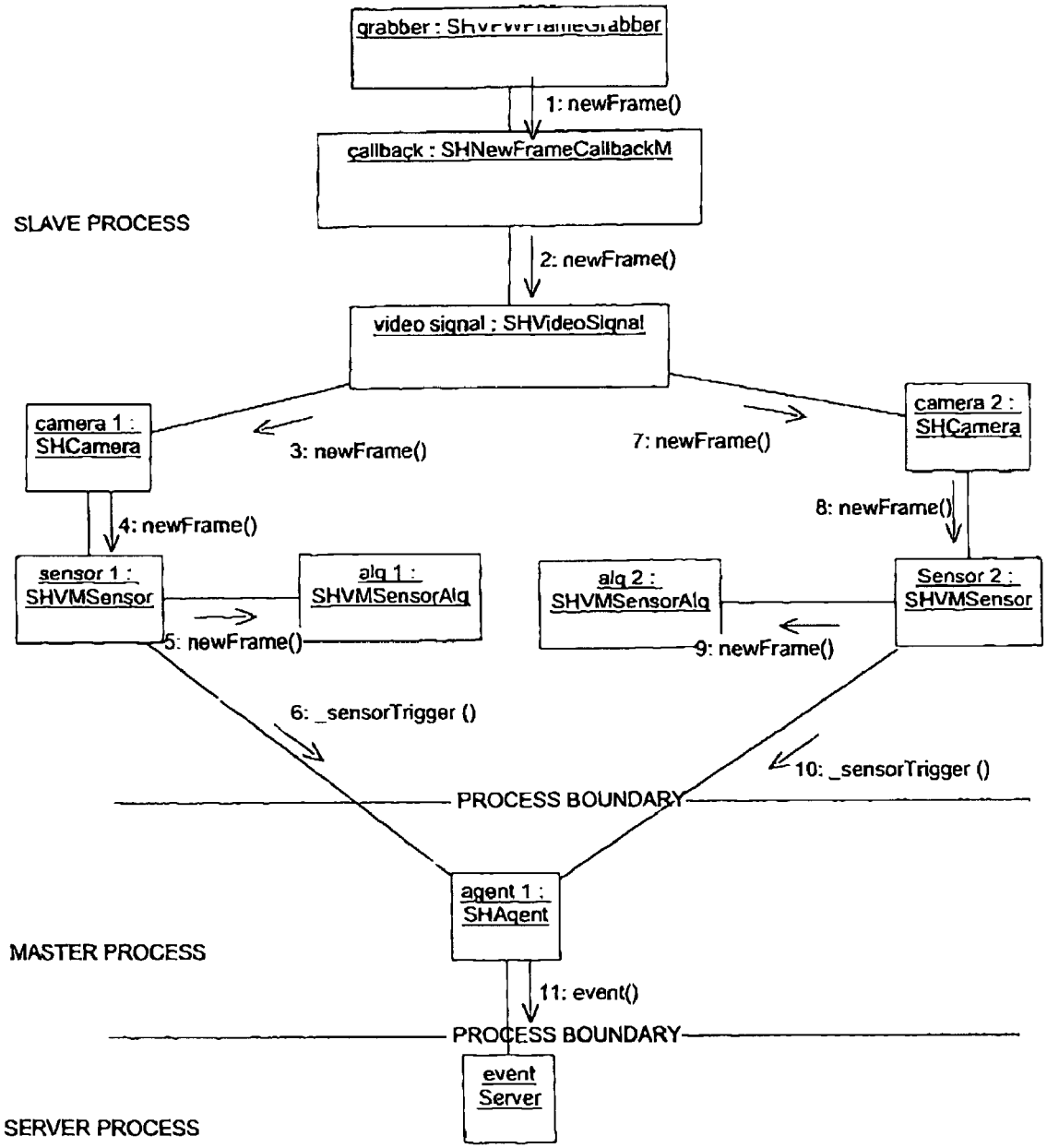
FIGS. 17 and 18 are process flow diagrams for the classes.

In the example of FIG. 17 the signals from two cameras have been combined to form a single video signal. Objects have been instantiated to represent the two cameras, as well as the combined video signal. A single sensor object has been associated with each camera Each sensor object utilises a video motion sensing algorithm object to detect motion. Finally, both sensor objects have been associated with the same agent object. Video for Windows utilises its own thread for callbacks. When the Same grabber is called into by Video for Windows (not shown), the following sequence of events takes place on that thread. The grabber calls into callback, which in turn, calls back into the video signal The video signal calls newFrame( ) on the first of its cameras, which in turn, calls into its sensor. The sensor delegates its processing to its VMO algorithm which, in this example, returns true to indicate a trigger. As a result of this, the sensor sends a trigger message to its agent. Currently, only one of the agent's sensors has triggered, so it takes no action. After the call into the first camera has returned, the video signal calls into the second camera The net result of this is that the agent is sent another trigger message.

Figure 18:
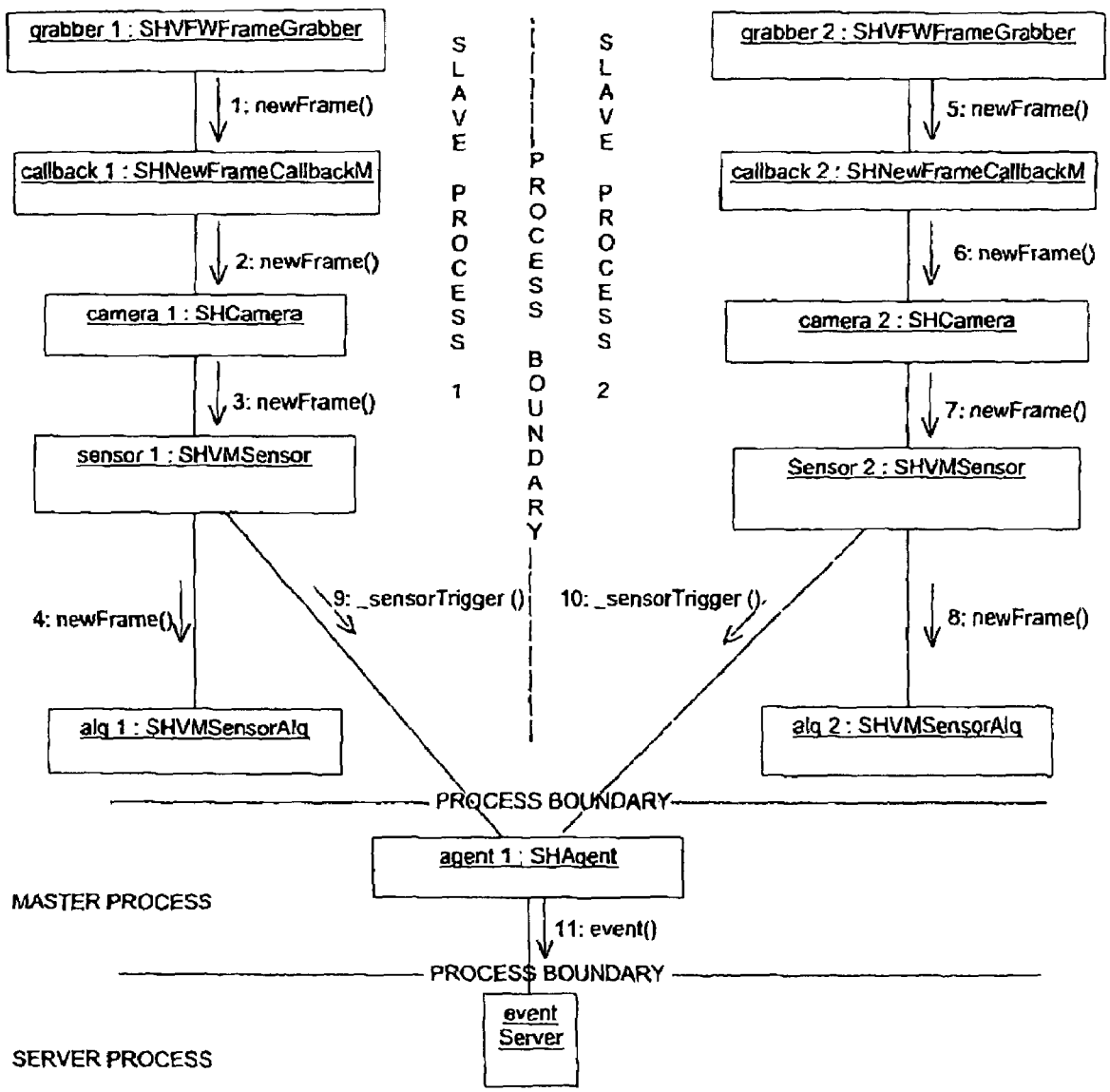

In the example of FIG. 18 there are two slaves, a master and a server process. Each slave has a frame grabber card processing the video signal from a single camera Software objects have been instantiated to represent the grabber and camera in each slave. They are linked via callback objects. Each camera has been associated with one sensor object. Each of the sensor objects utilises a video motion sensing algorithm object. Both sensor objects have been associated with the same agent object, which is in the master. Video for Windows utilises its own thread for callbacks. The processing is initiated by these callbacks. The system does not need to synchronise Video for Windows processing on the different slaves. In the above scenario, grabber 1 is slightly ahead of grabber 2 in time. The following is executed. Grabber 1 calls into callback 1, which in turn calls into camera 1. Camera 1 calls into sensor 1. Sensor 1 delegates its processing to alg 1 by calling newFrame( ). At about this time, grabber 2 calls into callback 2. This causes a call sequence which results in newFrame( ) being called on alg 2. Some time later, the newFrame( ) call on alg 1 returns true. As a result of this, sensor 1 sends a trigger message to agent 1. Currently, only one of the agent's sensors has triggered, so it takes no action. Some time later yet again, the newFrame ( ) call on alg 2 returns true. As a result of this, sensor 2 also sends a trigger message to agent 1. This time however, both of agent 1's sensors are in a triggered state, so it creates an event object and fires it off to the event server object, which is in the server process.

Many modifications will be apparent to those skilled in the art without departing from the scope of the present invention as herein described with reference to the accompanying drawings.

LOGICAL VIEW REPORT

TABLE OF CONTENTS

TABLE OF CONTENTS ........................................................................................................... 10
5 LOGICAL VIEW REPORT ................................................................................................ 11
    LOGICAL VIEW ........................................................................................................... 11
    MASTER ....................................................................................................................... 11
        SHAgent ................................................................................................................... 11
        SHMaster ................................................................................................................. 11
10    ZORBA ......................................................................................................................... 12
        SHMessageServer ................................................................................................... 12
        SHMessageTarget .................................................................................................. 12
        SHProxy .................................................................................................................. 13
        SHConnection ........................................................................................................ 13
15    IMAGING .................................................................................................................... 13
        SHImageBase ......................................................................................................... 13
        SHImage ................................................................................................................. 14
        SHFrameSequence ................................................................................................ 14
        SHVFWFrameGrabber ......................................................................................... 15
20       SHRGBColour ....................................................................................................... 15
        SHHLSColour ........................................................................................................ 15
        SHHSVColour ........................................................................................................ 15
        SHNewFrameCallback ......................................................................................... 15
        SHNewFrameCallbackM ...................................................................................... 15
25       SHRect ..................................................................................................................... 16
        SHSize ..................................................................................................................... 16
        SHVMSensorAlg ................................................................................................... 16
        SHPoint .................................................................................................................. 16
    SLAVE .......................................................................................................................... 16
30       SHVideoSignal ....................................................................................................... 16
        SHCamera ............................................................................................................... 17
        SHVMSensor ......................................................................................................... 17
        SHSlave .................................................................................................................. 17
    TOTALS: ...................................................................................................................... 19
35 LOGICAL PACKAGE STRUCTURE ............................................................................... 19

LOGICAL VIEW REPORT

Logical View

These diagrams summarise some of the main classes involved in video motion detection. Other classes are involved besides the ones specified. Furthermore, only some of the more 'interesting' class methods have been specified.

Master

The Master library defines some of our higher level business objects. It is closely related to the Slave library. The two are designed to work in conjunction with each other. Along with the Slave library, the Master library defines some of our main business objects, the most notable of which is the agent.

SHAgent

An agent utilises sensors for the purpose of protecting or monitoring some kind of item. In its simplest form, an agent responds to remote trigger messages sent to it by its sensors (ie sensors remotely calling sensorTrigger()). If it detects that all of its sensors are concurrently triggered, it will create an event object (not shown) and send it to the event server (also not shown).

Derived from SHMessageTarget

Private Attributes:
RWCString name

Public Operations:
```
void _useSensor (SHProxy sensor)
void _discardSensor (SHProxy sensor)
size_t _numSensors ()
SHProxy _sensor (size_t i)
void _sensorTrigger (SHProxy sensor, bool triggerState)
void arm ()
void disarm ()
```

SHMaster

This class represents the root object within the Master subsystem. When a master connects to a Slave, it obtains proxies to each of the Slave's cameras. These proxies are then cached by the Master. When the User Interface, for example, connects to a Master, it can directly access the cameras cached by the Master. Thus there is no need for the User Interface to have direct knowledge of Slaves.

Derived from SHMessageTarget

Private Attributes:
RWCString name

Public Operations:

SHProxy_appendAgent ()
void _renameAgent (SHProxy agent)
void _deleteAgent (SHProxy agent)
void _armAgents ()
void _disarmAgents ()
size_t _numCameras ()
SHProxy_camera (size_t i)

Zorba

Zorba implements our remote, inter-process messaging.

SHMessageServer

This class is responsible for listening for connection requests made by other processes and for establishing connections to these processes in order to process messages that they send. When a connection to another process is established, a new message loop, operating on a seperate
thread, is created. The message loop uses an SHConnection to continually read in the next message and dispatch it to the appropriate SHMessageTarget.

Public Operations:

void start ()
void stop ()
void join ()

Private Operations:

void listenForConnections ()
void runMessageLoop ()

SHMessageTarget

This class provides the ability to receive messages originating from other processes. A system of message maps is used to dispatch an incoming remote message to the correct handler method. Classes need to derive from this class and set up their message maps, in order to utilise this functionality. Inspired by MFC message maps!

Public Operations:

void processMessage (SHConnection con)
    Processes message which is expected to be waiting for retreival from the specified SHConnection instance. The message is dispatched to the appropriate handler method.
RWCString targetId ()
    Returns a string which uniquely defines the instance of the message target within the process in which it resides. This string may be utilised by SHProxy instances in other processes.

SHProxy

This class represents an indirect link to an SHMessageTarget instance residing within another process. It allows messeges to be sent to that object. An SHProxy caches a counted reference to an SHConnection which it utilises to send messages to the remote SHMessageTarget. The SHProxy also caches the message target's unique target id which is used by the underlying messaging protocol.

Private Attributes:

| |
|---|
| SHConnection conn_ |
| RWCString targetId_ |

Public Operations:

| |
|---|
| void sendMessage () |

SHConnection

Basic wrapper around an RWSocketPortal. Represents a connection to another process and a means of sending and receiving data to and from that process. Implements templated streaming operators for sending and receiving data.

This class is provides reference counting services to other classes.

Private Attributes:

| |
|---|
| RWSocketPortal portal_ |
| size_t refs_ |

Public Operations:

| |
|---|
| return addReference () |
| size_t removeReference () |
| size_t references () |
| void operator<< () |
|     Templated streaming operator for data transmission. |
| void operator>> () |
|     Templated streaming operator for data reception. |

Imaging

Imaging is a library of image processing classes including points, rects, colours, images and video motion sensing algorithms.

SHImageBase

Abstract base class for an image. Derived classes need to override and implement pixelPtrAt(). Offers various image processing support methods, such as the ones specified.

Private Attributes:
size_t width_
size_t height_

Public Operations:
SHRGBColour colourAt( size_t x, size_t y)
size_t hueAt( size_t x, size_t y)
size_t greyscaleAt( size_t x, size_t y)

Protected Operations:
const unsigned char* pixelPtrAt( size_t x, size_t y)

SHImage

Concrete image class implementation. Overrides and implements pixelPtrAt(). This class is platform specific. The current implementation is for WIN32 based compilers only.
Derived from SHImageBase Private Attributes:
BITMAPINFO* bitmapInfoPtr_
unsigned char* pixelBuffer_

Public Operations:
bool draw ( HDC dc, const RECT& rect)

Protected Operations:
const unsigned char* pixelPtrAt( size_t x, size_t y)

SHFrameSequence

An abstract base class for something which is a changing sequence of image frames. Provides the facility for users to register a new-frame-callback which is called every time a derived concrete implementation calls newFrame(). This class is here in order to easily be able to implement other non-frame grabber types of frame sequence, such as MPEG or AVI frame sequences.
Derived from SHImage Public Operations:
void regNewFrameCallback ( SHNewFrameCallback* callback)

Protected Operations:

```
void newFrame ( unsigned char* frameBufferPtr)
bool doStart ()
bool doStop ()
```

SHVFWFrameGrabber

Concrete implementation of a frame sequence.
This particular class knows about Microsoft Video for Windows frame grabbing and hence is platform dependent.

NOTE: Video for Windows frame grabbing owns its own thread of execution. It utilises a C-style callback to notify the outside world that a new frame is available for processing. We're stuck with doing it way. This class hides that paradigm and implements the more OO paradigm of a callback object (via inheritance from SHFrameSequence). See SHNewFrameCallback for more details.

Derived from SHFrameSequence

Protected Operations:

```
bool doStart ()
bool doStop ()
```

SHRGBColour
SHHLSColour
SHHSVColour
SHNewFrameCallback

Abstract base class for an OO-style callback. Derived classes need to override and implement newFrame(). When a derivative of this class is registered with an SHFrameSequence derivative, newFrame() is called polymorphically by the frame sequence.

Public Operations:

```
void newFrame ( unsigned char* frameBufferPtr)
```

SHNewFrameCallbackM

A templated class whose template type is that of the object to be called back into. This class stores an instance pointer to that object, as well as a method pointer to a method of the correct signature for receiving new frame notifications. In the implementation of the virtual method newFrame(), the method is called on the object instance.

Derived from SHNewFrameCallback

Private Attributes:

```
T* instance_
void (T::*)(unsigned char* buf) memberFunc
```

Public Operations:

| |
|---|
| void newFrame ( unsigned char* frameBufferPtr) |

SHRect
SHSize
SHVMSensorAlg

This class does the work of video motion sensing. It caches a reference to an SHImageBase and uses the appropriate image processing support methods to do its stuff. One iteration of sensing is performed each time newFrame is called. This class stores a collection of SHPoints that define the algorithm's area of interest. On each newFrame the class returns whether motion is detected or not and, if so, where on the boundary and where internally that motion occurred.

Public Operations:

| |
|---|
| void newFrame : size_t () |

SHPoint

Slave

The Slave library defines classes used to develop a slave-like application. It is closely coupled to the Master library. The Slave library classes such as video signals, cameras and sensors. We consider these to be some of our business objects. They are higher level than the classes belonging to the Imaging and Zorba libraries.

SHVideoSignal

The video signal's sole existance is to allow for multiple (e.g. quaded) cams. The SHVideoSignal is an aggregate of one or more SHCamera instances. The video signal also owns a concrete SHFrameSequence derivative to which it registers a new frame callback. When newFrame() is called, via the callback, the video signal calls newFrame() for each of its cams.

Private Attributes:

| |
|---|
| SHNewFrameCallbackM<SHVideoSignal> newFrameCallback |
| size_t numXCams_ |
| size_t numYCams |

Public Operations:

| |
|---|
| void newFrame ( unsigned char* buf) |

SHCamera

The SHCamera stores enough information to determine the region of the frame buffer passed to it in newFrame(), that belongs to itself. The SHCamera is also a concrete SHImageBase derivation and uses this information in its override of pixelPtrAt(), to reference the correct pixel.

Derived from SHImageBase, SHMessageTarget

Private Attributes:

const unsigned char* frameBuf
SHSize frameBufSize
SHRect camRect
RWCString name_

Public Operations:

void newFrame ( unsigned char* buf)
const unsigned char* pixelPtrAt ( size_t x, size_t y)
void load ()
void save ()
SHProxy _appendSensor ()
void _deleteSensor ()
void _renameSensor ()
SHProxy _sensor (size_t i)
void _clear ()
RWCString _name ()
SHSize _resolution ()

SHVMSensor

The video motion sensor is basically implemented in terms of an SHVMSensorAlg. However, the SHVMSensor is a SHMessageTarget while the SHVMSensorAlg is not. The separation is artificial, but it does allow us to develop sensor algorithm test rigs which are independent of Zorba and Rogue Wave.

Derived from SHMessageTarget

Private Attributes:

RWCString name_

Public Operations:

void _registerAgent (SHProxy agentProxy)
void _discardAgent (SHProxy agentProxy)
size_t _numAgents ()
SHProxy _agent (size_t i)

SHSlave

The SHSlave represents the root object within the Slave subsystem. All other SHMessageTarget derived objects within the Slave subsystem are accessed via this object.

Derived from SHMessageTarget

Private Attributes:

RWCString name_

Public Operations:
size_t _numCameras ()
SBProxy_camera ( size_t i)

TOTALS:

6 Logical Packages
23 Classes

LOGICAL PACKAGE STRUCTURE

Logical View
        Master
        Zorba
        Imaging
        Slave

The invention claimed is:

1. An object monitoring system, including:
   a slave system having slave processors and a plurality of cameras for monitoring one or more objects, each camera having a field of view, images of said cameras being processed by respective ones of said slave processors, and said slave processors including sensors assigned to respective cameras and at least parts of the fields of view of said cameras to analyze said at least parts, detect predetermined characteristics of said at least parts and generate a trigger in response thereto;
   a master system having a master processor including agents assigned to at least one of said objects and having one or more of said sensors allocated thereto, each of said agents being allocated at least two sensors that are from different processors, and said agents each generating an event on receiving said trigger from the one or more allocated sensors; and
   an event system receives events from said agents and determines whether the received events represent an alarm condition, wherein said event system identifies the occurrence of an alarm condition only when said master system receives a trigger from a specified combination of said sensors.

2. An object monitoring system as claimed in claim 1, wherein said at least parts represent monitored zones and said predetermined characteristics include changes in said zones.

3. An object monitoring system as claimed in claim 1, wherein said agents are assigned to protect respective objects.

4. An object monitoring system as claimed in claim 1, wherein said agents are allocated said sensors of one of said slave processors.

5. An object monitoring system as claimed in claim 1, wherein said agents are allocated said sensors of a number of said slave processors.

6. An object monitoring system as claimed in claim 1, wherein said event is an alarm.

7. An object monitoring system as claimed in claim 2, including a user interface for selectively displaying said zones in response to said events.

8. An object monitoring system as claimed in claim 2, including a user interface for selecting said zones assigned to said sensors and allocating said sensors to said agents.

9. An object monitoring system as claimed in claim 1, including a user interface for generating alarm signals in response to said events.

10. An object monitoring system as claimed in claim 1, including a user interface for generating displays in response to determination of said alarm condition.

11. An object monitoring system as claimed in claim 2, wherein said sensors include motion detection sensors that compare pixel values of the zone with a statistical model of normality for pixels of the zone to detect movement in said zone.

12. An object monitoring system as claimed in claim 11, wherein said motion detection sensors operate on hue, saturation and brightness levels of said zones.

13. An object monitoring system as claimed in claim 1, wherein said predetermined characteristics include a cluster of pixels having a predetermined hue and saturation range representing human skin.

14. An object monitoring system as claimed in claim 2, wherein said sensors include a tracking sensor to track a cluster of pixels representing at least part of a human.

15. An object monitoring system as claimed in claim 14, wherein said tracking sensor generates control messages to control a moveable camera.

16. An object monitoring system as claimed in claim 14, wherein said cluster of pixels has a predetermined hue and saturation range corresponding to human skin.

17. An object monitoring system as claimed in claim 14, wherein said tracking system tracks a human face.

18. An object monitoring system as claimed in claim 17, wherein said sensor generates a 3D pose of a tracked face.

19. An object monitoring system as claimed in claim 18, wherein said system is adapted to execute recognition on based on said pose.

20. An object monitoring system as claimed in claim 1, including a control platform connected to a network and a display device, said control platform being adapted to receive and control direction of a plurality of digital data feeds, such as video signals from said cameras and video signals from different services, and having a user interface to control display of any of the data feeds on the display device.

21. An object monitoring system as claimed in claim 1, wherein at least one of said agents generates an event only on receipt of a trigger from a plurality of said sensors.

22. An object monitoring system as claimed in claim 1, wherein said event system determines the occurrence of an alarm condition only on receipt of combinations of event messages.

23. An object monitoring system as claimed in claim 22, wherein said alarm condition is determined to occur only when said combinations of event messages are received within a predetermined time constraint.

24. An object monitoring system as claimed in claim 1, wherein said object monitoring system generates alarm signals in response to determining the occurrence of an alarm condition.

25. An object monitoring system, including:
   a plurality of sensors assigned to respective zones in a monitored area and which process pixels representing a zone to detect predetermined characteristics in said zone and generate a trigger in response thereto;
   a plurality of agents respectively assigned to at least one object and having one or more of the sensors allocated thereto, at least two of said allocated sensors monitoring different zones, and said agents generating respective events on receiving triggers from the one or more allocated sensors; and
   an event processor receives the events and generates an alarm signal when said events represent an alarm condition, wherein said event processor identifies the occurrence of an alarm condition only when a specified combination of said sensors generate a trigger.

26. An object monitoring system as claimed in claim 25, wherein the sensors and agents are software objects and the triggers and events are messages generated by the software objects.

27. An object monitoring system as claimed in claim 25, wherein said sensors include motion detection sensors that compare pixel values of the zone with a statistical model of normality for pixels of the zone to detect movement in said zone.

28. An object monitoring system as claimed in claim 27, wherein said motion detection sensors operate on hue, saturation and brightness levels of said zones.

29. An object monitoring system as claimed in claim 25, wherein said predetermined characteristics include a cluster of pixels having a predetermined hue and saturation range representing human skin.

30. An object monitoring system as claimed in claim 25, wherein said sensors include a tracking sensor to track a cluster of pixels representing at least part of a human.

31. An object monitoring system as claimed in claim 30, wherein said tracking sensor generates control messages to control a moveable camera.

32. An object monitoring system as claimed in claim 30, wherein said cluster of pixels has a predetermined hue and saturation range corresponding to human skin.

33. An object monitoring system as claimed in claim 30, wherein said tracking system tracks a human face.

34. An object monitoring system as claimed in claim 33, wherein said sensor generates a 3D pose of a tracked face.

35. An object monitoring system as claimed in claim 34, wherein said system is adapted to execute recognition on the basis of said pose.

36. A method of monitoring an object, including:
    monitoring a plurality of zones in an area using a plurality of sensors for each zone, each of which processes pixels representing said zone;
    detecting predetermined characteristics in said zone using said sensors and generating a trigger at one of said sensors in response to said sensor detecting a predetermined characteristic;
    receiving said trigger at an agent assigned to said object and to which said sensors are assigned, wherein sensors from more than one zone are assigned to said agent;
    generating an event using said agent in response to receiving triggers from a plurality of sensors assigned to the agent; and
    detecting said event and determining whether an alarm condition exists, wherein the occurrence of an alarm condition is identified only when each one of a specified combination of said sensors generates a trigger.

37. Computer software stored on a computer readable storage media having code for executing the steps of the method of claim 36.

38. An object monitoring system comprising:
    a plurality of cameras;
    a plurality of slave processors, each comprising a plurality of software sensors,
    a plurality of software agents; and
    an event system; wherein:
    each of said cameras is allocated to one of said slave processors;
    each of said software sensors analyses at least a part of the image produced by the camera allocated to its slave processor, and generates a trigger when it detects a predetermined characteristic of said part;
    each of said agents is allocated to and receives triggers from a plurality of said software sensors, at least two of said allocated software sensors belonging to different slave processors;
    each of said software agents generates an event when it receives a trigger from each software sensor in a predetermined set of its allocated software sensors; and
    said event system receives events from said software agents and automatically determines whether the received events represent an alarm condition.

39. A method of monitoring an object, comprising the steps of:
    generating images using a plurality of cameras, each of which has a plurality of allocated sensors, wherein each of said sensors processes pixels representing at least a part of the image produced by its allocated camera;
    at least one of said sensors, detecting a predetermined characteristic and generating a trigger;
    at an agent that is allocated to a set of said sensors, at least two of the set of sensors being allocated to different cameras, receiving a plurality of triggers from at least some of said set of sensors;
    at said agent, identifying a condition to the effect that said plurality of triggers conform to a predetermined set of triggers and generating an event; and
    detecting said event and automatically determining whether an alarm condition exists.

* * * * *

UNITED STATES PATENT AND TRADEMARK OFFICE
CERTIFICATE OF CORRECTION

PATENT NO. : 7,657,914 B2  Page 1 of 1
APPLICATION NO. : 10/257462
DATED : February 2, 2010
INVENTOR(S) : Whelan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1372 days.

Signed and Sealed this

Thirtieth Day of November, 2010

David J. Kappos
*Director of the United States Patent and Trademark Office*